United States Patent
Carlson et al.

(10) Patent No.: US 9,677,767 B2
(45) Date of Patent: Jun. 13, 2017

(54) COMBUSTION TURBINE WITH SIAMESED WALL PAIRED COMBUSTOR HOUSINGS

(71) Applicant: SIEMENS ENERGY, INC., Orlando, FL (US)

(72) Inventors: Andrew Carlson, Jupiter, FL (US); William W. Pankey, Palm Beach Gardens, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 300 days.

(21) Appl. No.: 14/290,011

(22) Filed: May 29, 2014

(65) Prior Publication Data

US 2015/0345796 A1 Dec. 3, 2015

(51) Int. Cl.
*F23R 3/46* (2006.01)
*F02C 3/14* (2006.01)
*F23R 3/60* (2006.01)

(52) U.S. Cl.
CPC .................. *F23R 3/46* (2013.01); *F02C 3/14* (2013.01); *F23R 3/60* (2013.01)

(58) Field of Classification Search
CPC ...... F23R 3/46; F23R 3/42; F23R 3/60; F23R 3/283; F23R 3/30; F23R 3/04; F02C 7/20
USPC ......................................................... 220/378
See application file for complete search history.

(56) References Cited

U.S. PATENT DOCUMENTS

| 6,449,952 | B1 * | 9/2002 | Emilianowicz | F01D 25/243 60/752 |
|---|---|---|---|---|
| 2002/0096522 | A1 * | 7/2002 | Palvoelgyi | B60K 15/03 220/378 |
| 2005/0050899 | A1 * | 3/2005 | Little | F02C 7/228 60/773 |
| 2008/0110174 | A1 * | 5/2008 | Brown | F23R 3/10 60/752 |
| 2012/0240583 | A1 * | 9/2012 | Penz | F23R 3/002 60/722 |
| 2014/0137535 | A1 * | 5/2014 | Kim | F02C 7/24 60/39.37 |
| 2015/0078887 | A1 * | 3/2015 | Ueda | F01D 25/162 415/116 |
| 2015/0132117 | A1 * | 5/2015 | Marra | F01D 9/023 415/187 |
| 2015/0345792 | A1 * | 12/2015 | Carlson | F23R 3/283 60/796 |

* cited by examiner

*Primary Examiner* — James N Smalley

(57) ABSTRACT

A combustion turbine engine combustor section includes a plurality of annularly arrayed combustors housed within paired combustor portals of a combustor casing. Each combustor portal has a corresponding top hat cover having a peripheral flange. The paired combustor portals are formed in combustor housings having a figure eight-shaped sleeve wall planform. The paired adjoining combustor portals share a common Siamesed portion of the sleeve wall. A combustor portal mating surface is formed on an axial distal end of the sleeve wall, having a figure eight planform and defining a first array of fastener receiving apertures. A top hat cover retention bracket assembly having a composite planform conforming to the combustor portal mating surface planform and a second array of apertures that conform to the first array pattern apertures, is placed over the peripheral flanges of the paired combustor top hat covers and secured by top hat cover fasteners.

14 Claims, 4 Drawing Sheets

COMBUSTION TURBINE WITH SIAMESED WALL PAIRED COMBUSTOR HOUSINGS

BACKGROUND OF THE INVENTION

1. Field of the Invention

The invention relates to combustion turbine combustor housings. More particularly, embodiments of the invention relate to paired combustor housings wherein a pair of adjoining combustors shares a common Siamesed housing wall, so as to reduce combustor circumferential spacing around the combustor midframe. Reduced combustor circumferential spacing facilitates adding one or more additional combustors within a given midframe circumference or reducing the frame circumference to accommodate the same number of combustors.

2. Description of the Prior Art

Referring to FIGS. 1-3 an exemplary known construction industrial combustion or gas turbine engine 10 is shown. The exemplary engine 10 includes a compressor section 12, a combustor section 14, a turbine section 16, and an exhaust section or system 18. The combustor section 14 includes a plurality of combustors 20 that are arrayed about a combustor midframe 22, within combustor housings 22A. Each combustor 20 is communication with the combustor section 14 interior via a corresponding combustor portal 23 formed in the combustor housing 22A. Each combustor 20 has a "top hat" cover 24 that is affixed to a combustor portal mating surface 26. The combustor portal mating surface 26 has an array of threaded apertures 27 about its circumference that are aligned coaxially with a top hat flange 28 and its array of corresponding through hole apertures 29. The top hat cover flange 28 is then affixed to combustor portal 23 by passing top hat cover fasteners 30 through the through hole apertures 29, which then engage the corresponding combustor portal mating surface threaded apertures 27.

As shown in FIG. 3, some exemplary known combustor housing configurations include a circumferential support web 32 that is formed between adjacent combustor housings 22A and their corresponding combustor portals 23. The series of known independent stand-alone combustor housings 22A and corresponding combustor portals require adjacent circumferential spacing S for lateral clearance between adjacent combustor cover top hat flanges 28. Thus, in any given engine design, the combustor casing 22 annular inner and outer diameter are largely determined by the number of combustors, their combustor portal 23 diameter and the lateral clearance S between adjoining combustor portals.

It is desirable to minimize combustion case annular inner and outer diameter so as to minimize the case required fabrication size, which can only be accomplished by reducing the number of combustors, the combustor portal diameter or lateral spacing between combustors. Conversely it is desirable to maximize the number of combustors in a turbine engine design.

SUMMARY OF THE INVENTION

In accordance with embodiments of the invention, a combustion turbine engine combustor section includes a plurality of annularly arrayed combustors housed within paired combustor portals of a combustor casing. Each combustor portal has a corresponding top hat cover having a peripheral flange. The paired combustor portals are formed in combustor housings having a figure eight-shaped sleeve wall planform. The paired adjoining combustor portals share a common Siamesed portion of the sleeve wall, which reduces lateral spacing between the adjoining combustor portals. A combustor portal mating surface is formed on an axial distal end of the sleeve wall, having a figure eight planform and defining a first array of fastener receiving apertures. A top hat cover retention bracket assembly having a composite planform conforming to the combustor portal mating surface planform and a second array of apertures that conform to the first array pattern apertures, is placed over the peripheral flanges of the paired combustor top hat covers and secured by top hat cover fasteners. Sharing a common Siamese wall between adjoining combustors reduces the lateral spacing between combustor portals, which facilitates reduction in the combustor section case diameter or alternatively facilitates increasing the number of combustor portals in the engine.

Embodiments of the invention feature a combustion turbine combustor casing, comprising a combustor housing having a figure eight-shaped sleeve wall planform that defines a pair of adjoining combustor portals sharing a common Siamesed portion of the sleeve wall. A combustor portal mating surface is formed on an axial distal end of the sleeve wall, having a figure eight planform and defining a first array of fastener receiving apertures that are adapted for retention of a pair of combustor top hat covers over an associated combustor portal. Exemplary embodiments of the invention further include a top hat cover retention bracket assembly having a composite planform conforming to the combustor portal mating surface planform and a second array of apertures that conform to the first array pattern apertures. The retention bracket assembly is adapted for placement over peripheral flanges of combustor top hat covers and passage of combustor top hat cover fasteners into corresponding first array pattern apertures.

Other embodiments of the invention feature a combustion turbine engine, which includes compressor and turbine sections as well as a combustor section that has a plurality of annularly arrayed combustors housed within combustor portals of a combustor casing. The engine has a plurality of top hat covers having peripheral flanges corresponding to each combustor portal and a plurality of combustor housings having a figure eight-shaped sleeve wall planforms that respectively define a pair of adjoining combustor portals sharing a common Siamesed portion of the sleeve wall. A combustor portal mating surface is formed on an axial distal end of the sleeve wall, having a figure eight planform and defining a first array of fastener receiving apertures. A top hat cover retention bracket assembly having a composite planform conforming to the combustor portal mating surface planform and a second array of apertures that conform to the first array pattern apertures is placed over the peripheral flanges of the paired combustor top hat covers. Top hat cover fasteners are passed through the second array passages and engaged in the corresponding first array pattern apertures.

The respective features of embodiments of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
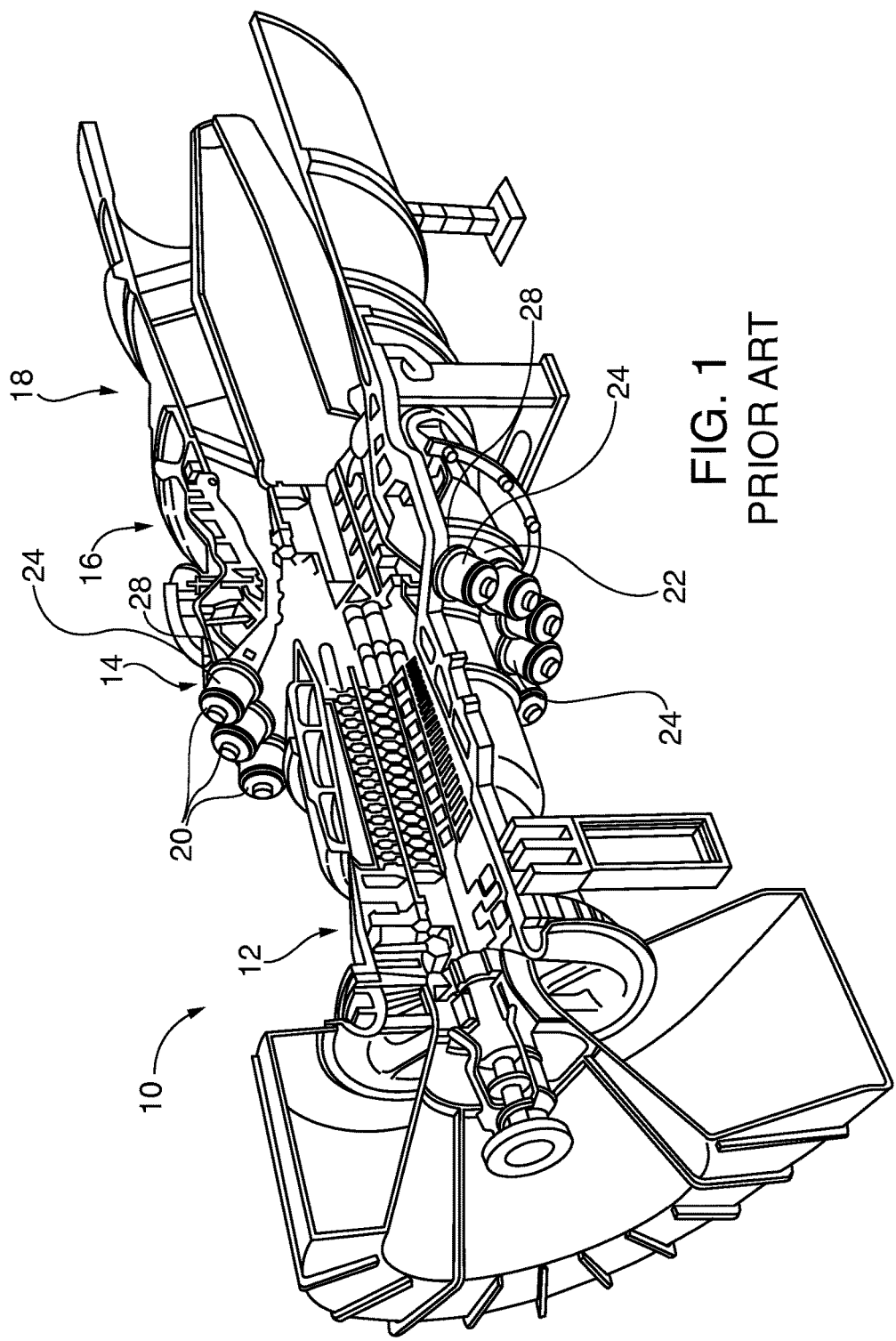
FIG. 1 is a perspective view of a known combustion gas turbine engine.
Figure 2:
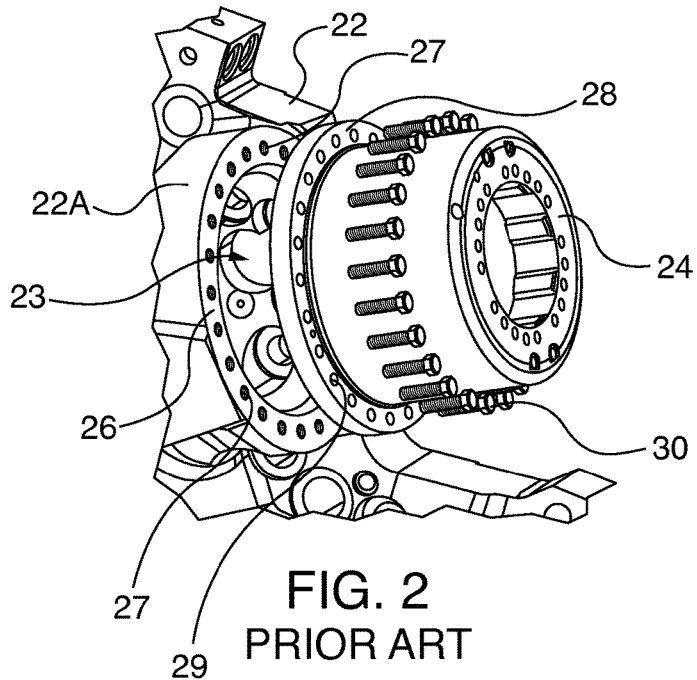
FIGS. 2 and 3 are perspective views of a known combustor housings and combustor top hat cover fastening interfaces, wherein each separate combustor housing has its own array of threaded apertures formed in the combustor midframe.

After considering the following description, those skilled in the art will realize that the teachings of exemplary embodiments of the present invention, which incorporate paired combustor housings with common Siamese wall between adjacent combustor portals, reduce lateral spacing between adjacent combustors. In embodiments of the invention top hat cover retention bracket assemblies retain adjoining top hat covers in the paired combustor housing, further reducing lateral spacing between adjacent combustors. Thus the described exemplary embodiments of the invention facilitate reduction in the combustor section combustor casing annular inner or outer diameter. Alternatively, embodiments of the present invention facilitate inclusion of one or more additional combustor portals within a given engine annular diameter.

Referring to FIGS. 4-7, the combustion turbine combustion section's combustor casing 40 has a plurality of annularly arrayed paired combustor housings 42. Each respective combustor housing 42 has a figure eight-shaped planform sleeve wall 42A that defines a pair of adjoining combustor portals 23 that share a common Siamesed sleeve wall portion 43. The combustor portal mating surface 44 is formed on an axial distal end of the sleeve wall 42A, which also has a figure eight planform. The embodiment of the combustor portal mating surface 44 includes an optional pair of ring seal grooves 46 that circumscribe each corresponding combustor portal 23 and retain corresponding ring seals 47. The combustor portal mating surface also defines a first array of fastener receiving apertures 48 that are adapted for retention of a pair of top hat covers 50 over an associated combustor portal 23. Each top hat cover 50 has a peripheral flange 52.

A top hat cover bracket assembly has a composite planform that conforms to the combustor portal mating surface 44; as shown the assembly comprises: (i) an X-bracket 54 having an X-shaped planform that conforms to a portion of the planform of the combustor portal mating surface 46 that is defined by the common Siamesed portion 43 of the sleeve wall; and (ii) a pair of C-brackets 58 having C-shaped planforms conforming to portions of the combustor portal mating surface that are distal the common Siamesed portion. The composite retention bracket assembly 54/58 defines an optional step recess 55 on bottom edges proximal to the combustor portal mating surface 44, for sandwiched compression capture of the combustor top hat cover 50 peripheral flanges 52 between the portal mating surface and the bracket assembly. The composite retention bracket assembly 54/58 defines a second array of apertures 58/60 that conform to the first array pattern apertures 48, which are formed in the combustor portal mating surface 44. Top hat cover threaded fasteners 70 are inserted through the aligned second array of apertures 58/60 and are engaged in the first array pattern apertures 48 of the portal figure eight-shaped portal mating surface 44. While the top hat cover bracket assembly embodiment shown comprises three components—X-bracket 54 and a pair of C-brackets 58, a fewer or larger number of components may be utilized.

Figure 3:
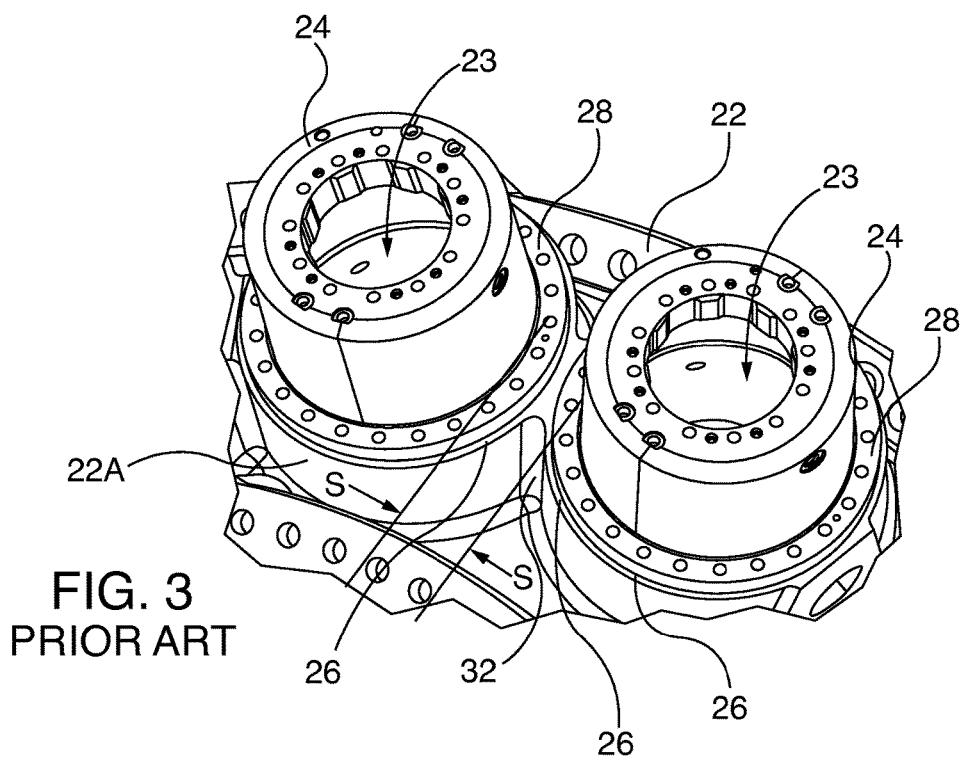
Figure 4:
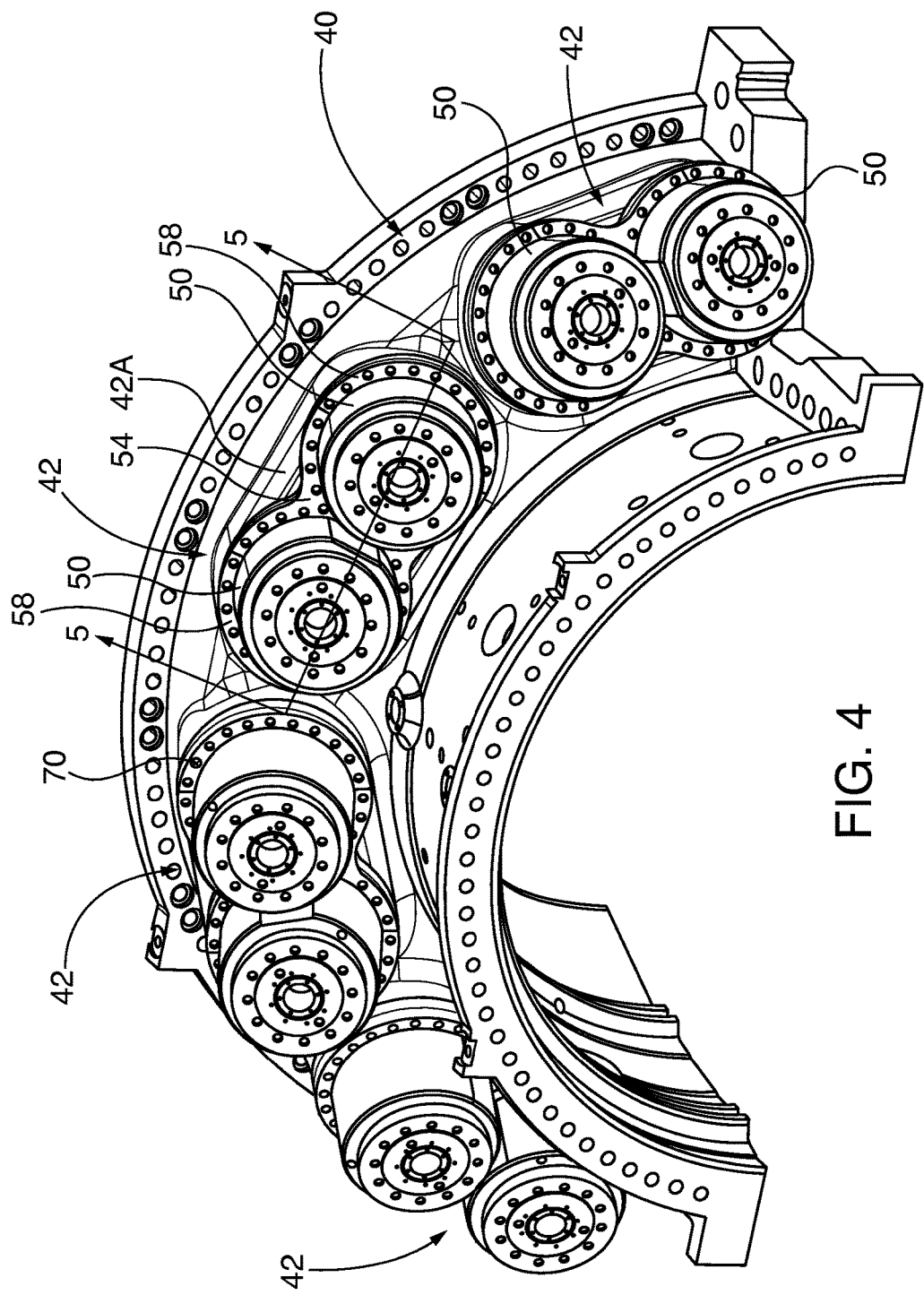
FIG. 4 is a perspective view of a combustion turbine combustor casing, which includes a plurality of paired combustor housings constructed in accordance with an exemplary embodiment of the invention.
Figure 5:
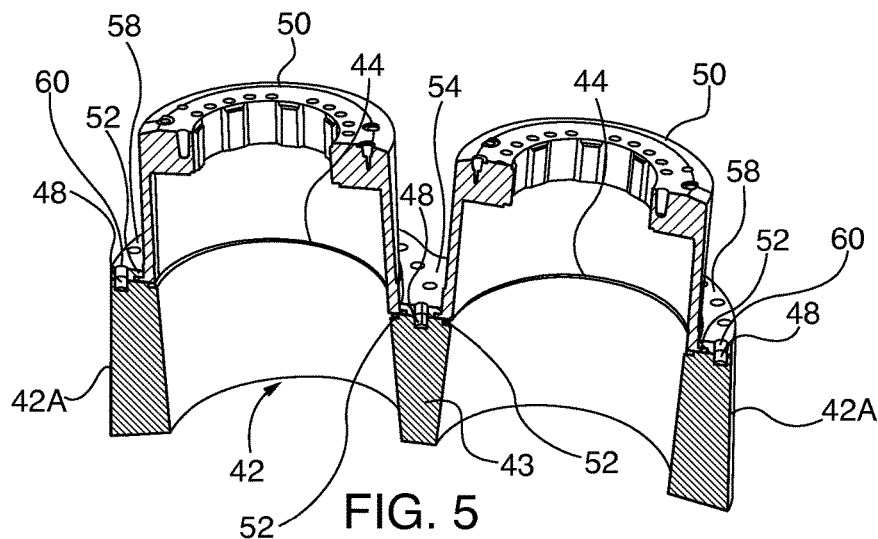
FIG. 5 is a cross sectional view of the paired combustor housing of FIG. 5, showing a common Siamese wall between a pair of adjoining combustor portals and a top hat cover retention bracket assembly that retains adjacent top hat covers.
Figure 6:
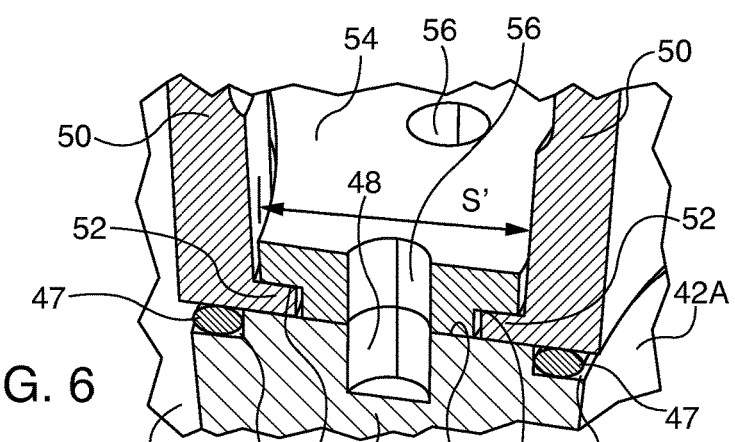
FIG. 6 is a detailed cross sectional view of a distal portion of the common Siamese wall and a portion of the retention bracket assembly of FIG. 5.
Figure 7:
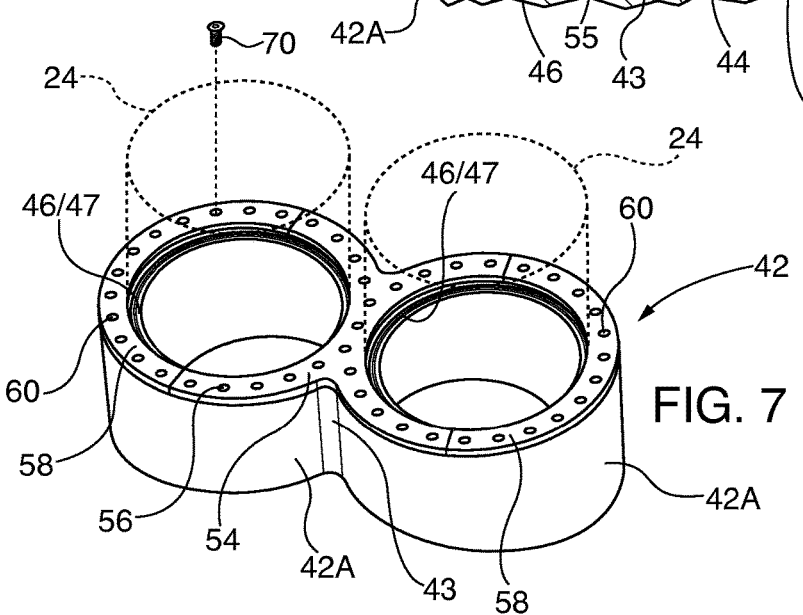
FIG. 7 is a perspective plan view of the paired combustor housing of FIG. 5 showing the retention bracket assembly aligned with the combustor housing portal mating surface, with the retained top hat covers shown in phantom.

The X-bracket component 54 advantageously retains peripheral flanges 52 of both adjoining top hat covers 50, which in turn advantageously requires a smaller lateral spacing S' between adjacent top hat covers than the lateral spacing S of the known independently retained top hat covers 24 shown in FIG. 3. As previously described, reduced lateral spacing between the adjacent top hat covers 50 in turn facilitates reduction of the turbine casing 40 annular diameter or inclusion of one or more additional combustor portals 23 within the same casing annular diameter.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A combustion turbine combustor casing, comprising:
   a combustor housing having a figure eight-shaped sleeve wall planform that defines a pair of adjoin combustor portals sharing a common Siamesed portion of the sleeve wall; and
   a combustor portal mating surface formed on an axial distal end of the sleeve wall, having a figure eight planform and defining a first array of fastener receiving apertures that are adapted for retention of a pair of combustor top hat covers over an associated combustor portal,
   a top hat cover retention bracket assembly having a composite planform conforming to the combustor portal mating surface planform and a second array of apertures that conform to the first array pattern apertures, the retention bracket assembly adapted for placement over peripheral flanges of the pair of combustor top hat covers and passage of combustor top hat cover fasteners into corresponding first array pattern apertures, wherein the retention bracket assembly defining a step recess on bottom edges proximal to the combustor portal, adapted for capture of peripheral flanges of the pair of combustor top hat covers thereunder.

2. The combustor casing of claim 1, the retention bracket assembly comprising an X-bracket having an X-shaped planform conforming to a portion of the planform of the combustor portal mating surface that is defined by the common Siamesed portion of the sleeve wall.

3. The combustor casing of claim 2, further comprising the retention bracket assembly comprising a pair of C-brackets having a C-shaped planform conforming to portions of the planform of the combustor mating surface that are distal the common Siamesed portion of the sleeve wall.

4. The combustor casing of claim 1, the retention bracket assembly comprising an X-bracket having an X-shaped planform conforming to a portion of the planform of the combustor portal mating surface that is defined by the common Siamesed portion of the sleeve wall.

5. The combustor casing of claim 4, further comprising the retention bracket assembly comprising a pair of C-brackets having a C-shaped planform conforming to a portions of the planform of the combustor mating surface that are distal the common Siamesed portion of the sleeve wall.

6. The combustor casing of claim 1, further comprising a pair of ring seal grooves formed in the combustor portal mating surface, respectively circumscribing a corresponding combustor portal.

7. The combustor casing of claim 1, further comprising a pair of ring seal grooves formed in the combustor portal mating surface, respectively circumscribing a corresponding combustor portal.

8. A combustion turbine engine, comprising:
compressor and turbine sections;
a combustor section including a plurality annularly arrayed combustors housed within combustor portals of a combustor casing;
a plurality of top hat covers having peripheral flanges corresponding to each combustor portal;
a plurality of combustor housings having a figure eight-shaped sleeve wall planforms that respectively define a pair of adjoin combustor portals sharing a common Siamesed portion of the sleeve wall;
a combustor portal mating surface formed on a axial distal end of the sleeve wall, having a figure eight planform and defining a first array of fastener receiving apertures; and
a top hat cover retention bracket assembly having a composite planform conforming to the combustor portal mating surface planform and a second array of apertures that conform to the first array pattern apertures, the retention bracket assembly adapted for placement over the peripheral flanges of the paired combustor top hat covers and passage of combustor top hat cover fasteners into corresponding first array pattern apertures,
wherein each retention bracket assembly defining a step recess on bottom edges proximal to the combustor portal, adapted for capture of the peripheral flanges of the plurality of top hat covers thereunder.

9. The turbine engine of claim 8, the retention bracket assembly comprising an X-bracket having an X-shaped planform conforming to a portion of the planform of the combustor portal mating surface that is defined by the common Siamesed portion of the sleeve wall.

10. The turbine engine of claim 9, further comprising the retention bracket assembly comprising a pair of C-brackets having a C-shaped planform conforming to a portions of the planform of the combustor mating surface that are distal the common Siamesed portion of the sleeve wall.

11. The turbine engine of claim 8, the retention bracket assembly comprising an X-bracket having an X-shaped planform conforming to a portion of the planform of the combustor portal mating surface that is defined by the common Siamesed portion of the sleeve wall.

12. The turbine engine of claim 11, further comprising the retention bracket assembly comprising a pair of C-brackets having a C-shaped planform conforming to a portions of the planform of the combustor mating surface that are distal the common Siamesed portion of the sleeve wall.

13. The turbine engine of claim 12, further comprising a pair of ring seal grooves formed in the combustor portal mating surface, respectively circumscribing a corresponding combustor portal.

14. The turbine engine of claim 8, further comprising a pair of ring seal grooves formed in the combustor portal mating surface, respectively circumscribing a corresponding combustor portal.

* * * * *